UNITED STATES PATENT OFFICE.

LOUIS ADLER, OF BALTIMORE, MARYLAND.

IMPROVEMENT IN THE MANUFACTURE OF BITARTRATE OF POTASSA.

Specification forming part of Letters Patent No. 145,607, dated December 16, 1873; application filed November 18, 1873.

*To all whom it may concern:*

Be it known that I, LOUIS ADLER, of Baltimore, in the county of Baltimore and State of Maryland, have invented a new and useful Improvement in the Process for Procuring Bitartrate of Potassa; and I do hereby declare the following to be a full, clear, and exact description thereof, which will enable others skilled in the art to which my invention appertains to manufacture and use the same.

The bitartrate of potassa of commerce is produced from grapes; and, up to this time, so far as I have been able to learn, none has ever been manufactured in the United States. The cost of importation added to the cost of manufacture has, therefore, rendered the article comcomparatively expensive to the consumer in this country.

The object of my invention is to simplify and cheapen the process by which such bitartrate is produced, so that its manufacture can be profitably carried on in this country to the exclusion of the more expensive, but no better, foreign article.

To accomplish this object I have discovered and perfected an improved process of procuring the bitartrate of potassa from the grapes, which may be described substantially as follows:

I take the refuse matter of grapes, after the wine or brandy has been drawn off in the manufacture of wine or brandy, and add to such refuse a quantity of water sufficient to make a thin paste. This is placed in a suitable vat or kettle, and boiled for a considerable time, or until the whole mass is somewhat thickened, when the liquid is drawn off into a tank or other suitable vessel of the requisite capacity. I now introduce into the last-mentioned vessel a quantity of switches, rods, or withes, and place them in such position that they will extend to every part of the liquid therein. These rods are to be left in the liquid until the bitartrate of potassa contained in solution therein is precipitated or deposited upon them, when they may be withdrawn, and the bitartrate of potassa removed from them for use in the crude form or for refining. This operation takes about eight days.

I prefer to use simply switches or withes for the purpose on account of their cheapness; but, of course, if preferred, any form of rod, chain, wire, or cord could be employed in place of them, and would be simply a mechanical equivalent for them. I also prefer to suspend the switches vertically in the liquid, but this is a mere matter of convenience, and their position may be varied at pleasure.

Any suitable frame or other support may be used for placing the switches in the liquid, holding them suitably therein, and removing them, or any portion of them, therefrom when the process is complete, or for the purpose of testing the progress of the work.

Having thus described my invention, what I claim as new, and desire to secure by Letters Patent, is—

The process for procuring bitartrate of potassa, substantially as herein described.

L. ADLER.

Witnesses:
NATHAN K. ELLSWORTH,
MELVILLE CHURCH.